United States Patent
Johansson et al.

(10) Patent No.: US 7,707,893 B2
(45) Date of Patent: May 4, 2010

(54) INDUSTRIAL ROBOT

(75) Inventors: Görgen Johansson, Västerås (SE);
Ingvar Jonsson, Västerås (SE)

(73) Assignee: ABB AB, Västeråa (SE)

( * ) Notice: Subject to any disclaimer, the term of this patent is extended or adjusted under 35 U.S.C. 154(b) by 0 days.

(21) Appl. No.: 11/991,103

(22) PCT Filed: Sep. 12, 2006

(86) PCT No.: PCT/EP2006/066276
§ 371 (c)(1),
(2), (4) Date: Feb. 27, 2008

(87) PCT Pub. No.: WO2007/031514
PCT Pub. Date: Mar. 22, 2007

(65) Prior Publication Data
US 2009/0088899 A1 Apr. 2, 2009

(30) Foreign Application Priority Data
Sep. 16, 2005 (EP) ................... 05108539

(51) Int. Cl.
*G01B 5/30* (2006.01)
(52) U.S. Cl. ........................ 73/760; 700/258
(58) Field of Classification Search ........... 73/760–860; 700/258
See application file for complete search history.

(56) References Cited

U.S. PATENT DOCUMENTS

| | | | | |
|---|---|---|---|---|
| 4,818,173 A | * | 4/1989 | Khusro | 414/735 |
| 5,490,427 A | * | 2/1996 | Yee et al. | 73/767 |
| 5,513,536 A | | 5/1996 | Reger et al. | |
| 5,593,293 A | * | 1/1997 | Machino et al. | 414/729 |
| 6,332,861 B1 | * | 12/2001 | Otsuka et al. | 483/55 |
| 7,086,293 B2 | * | 8/2006 | Heiligensetzer et al. | 73/795 |

FOREIGN PATENT DOCUMENTS

| | | |
|---|---|---|
| JP | 60164367 A | 8/1985 |
| JP | 62059826 A | 3/1987 |
| JP | 63088417 A | 4/1988 |
| JP | 05187940 A | 7/1993 |
| JP | 06083435 A | 3/1994 |

OTHER PUBLICATIONS

PCT/ISA/210—International Search Report—Nov. 3, 2006.
PCT/ISA/237—Written Opinion of the International Searching Authority—Nov. 3, 2006.

* cited by examiner

*Primary Examiner*—Max Noori
(74) *Attorney, Agent, or Firm*—Venable LLP; Eric J. Franklin

(57) ABSTRACT

An industrial robot including a tool flange at an end of an outer arm of the robot. A tool is secured to the tool flange. A sensor is configured to sense forces and/or torques applied to a tool secured to the tool flange. The sensor is built into the structure of the robot in the region of the tool flange.

14 Claims, 4 Drawing Sheets

INDUSTRIAL ROBOT

CROSS REFERENCE TO RELATED APPLICATIONS

This application claims priority to European patent application 05108539.7 filed 16 Sep. 2005 and is the national phase under 35 U.S.C. § 371 of PCT/EP2006/066276 filed 12 Sep. 2006.

TECHNICAL FIELD OF THE INVENTION AND PRIOR ART

The invention relates to an industrial robot having a tool flange at the end of an outer arm of the robot with means for securing a tool thereto and sensor means adapted to sense forces and/or torques applied to a tool secured to said tool flange.

All types of industrial robots having a tool flange are comprised. This tool flange, also called tool attachment, is preferably, but not necessarily, turnable with respect to said robot arm about a centre axis of said flange.

The number of axis of such an industrial robot is often six for obtaining a maximum freedom of movement of a tool secured to said tool flange. However, the invention also comprises industrial robots having less than six axis, such as only four, depending upon the work intended to be carried out by the robot. A conventional robot of this type having six axis is by way of example schematically shown in appended FIG. 1, in which the six axis are indicated by reference numerals 1-6. Accordingly, in this case the axis number 6 is the one for turning the tool flange around the centre axis thereof.

Appended FIG. 2 shows how a tool 7 (such as a milling tool shown in FIG. 1) is normally secured directly to said tool flange 8 by securing means in the form of bolts 9 and threaded holes 10 in the tool flange.

However, there is sometimes a need to measure forces and/or torques applied to a tool secured to said tool flange for ensuring that the forces desired for a good result of a process carried out by the tool are obtained. Such robot applications often are for example different types of assembly work within the fields of electronics and household appliances, polishing, grinding, for instance of faucets and turbine blades, milling (here also for protecting the tool), cleaning and friction stir welding, for example within the automotive and aircraft industries. The sensor means may also be used for measuring forces in a process for example for checking resilient details after mounting.

A third possibility is to use the sensor means for protecting an object handled by the tool and/or the tool itself. This is especially, but not exclusively, the case when the robot is adapted to handle objects to which such forces and/or torques have to be kept below comparatively low levels. An industrial robot may for example through the tool thereof not apply any substantial forces upon components, such as gear wheels, when assembling a gearbox, for example for a car. In such a case the industrial robot has to be provided with a sensor means as defined in the introduction.

FIG. 3 shows how industrial robots have been provided with such sensor means so far. The sensor means 11 is secured to the tool flange 8 and the tool 7 is then secured to the sensor means. Thus, the sensor means forms an intermediate part between the tool flange and the tool increasing the torques applied by the tool upon parts of the robot at the end of said outer arm, such as with respect primarily to said fifth axis in the case of a robot according to FIG. 1. Thus, the sensor means sense forces and/or torques applied to the tool flange and by that indirectly to a tool secured to said tool flange, and this is intended to be interpreted as the same in this disclosure. This increase in distance between the tool flange and the tool may be even greater than the thickness of the sensor means, since adapter discs may be necessary on both sides of the sensor means for enabling securing thereof to the tool flange and a securing member 12 of the tool. This so-called "added offset" causes additional stress on stiffness of robot parts, which is harmful to the accuracy of the tool movements and may by that reduce the work load capacity of the robot. This may result in a cost increase, since a bigger robot may be required. In the worst case such a sensor means may in fact make the robot application inappropriate or impossible. Furthermore, sensor means of this type are extremely costly and constitute a considerable part of the costs of the industrial robot being in the same order as the costs for the rest of the structural parts (the manipulator) of the robot.

SUMMARY OF THE INVENTION

The object of the present invention is to provide an industrial robot of the type defined in the introduction reducing the above drawbacks of such robots already known.

This object is according to the invention obtained by providing such an industrial robot, in which said sensor means is built into the structure of the robot in the region of said tool flange. This means that said "additional offset" for providing the robot with sensor means may be avoided or reduced, so that the workload capacity of the robot may be kept at substantially the same level as for a robot without said sensor means, so that no bigger robot may be required for handle a given load with a predetermined accuracy. Furthermore, no expensive sensor means is required, since sensor means built in into the structure of the robot may be provided at a substantially lower cost than discrete sensor means used so far (FIG. 3).

According to an embodiment of the invention said sensor means comprises one or more sensor members built into the tool flange, which constitutes one favourable way of realising the present invention having very little influence upon the construction of the robot.

According to another embodiment of the invention said sensor means comprises one or more sensor members arranged on a carrier to which the tool flange is rigidly connected. This alternative arrangement of said sensor members may under circumstances reduce the impact of the arrangement of the sensor means on the construction of the robot even less. Said carrier may be an axle pin or the like being integral with the tool flange. These two embodiments may very well be combined, so that sensor means may be built into the tool flange as well as arranged on said carrier.

According to another embodiment of the invention said sensor means comprises at least one tensiometer secured to the tool flange or a part rigidly connected thereto. The use of a tensiometer for sensing forces and/or torques applied to a tool secured to a tool flange results in a remarkable saving of costs with respect to the sensor means used so far while maintaining a high reliability. "Tensiometer" is here defined to cover all types of members adapted to measure forces by dilatation or extension of a body, such as wire strain gauges, semiconductor sensors, electro-resistive and piezo-resistive sensors and the like.

According to another embodiment of the invention said sensor means comprises a plurality of sensor members for sensing forces and/or torques according to a plurality of degrees of freedom. A sensor means delivering information of an extent desired for the intended application of said industrial robot may in this way be obtained by an appropriate selection of the number of said tensiometers, and in a further embodiment of the invention said sensor means comprises six sensor members for sensing and later evaluation of forces according to three degrees of freedom and torques according to three degrees of freedom, so that information about all forces and torques acting upon the tool flange and by that upon a said tool may be obtained for enabling a maximum degree of accuracy of the operation of the tool and the object handled thereby.

According to another embodiment of the invention said tool flange comprises a ring provided with said tool securing means and connected through substantially rigid spokes to an inner hub fixed to a carrier connected to said arm, and said sensor means comprises one or more sensor members arranged on one or more of said spokes. This constitutes a simple way of building said sensor means into the tool flange. The spokes and by that the sensor members will be influenced by forces and torques applied to a tool secured to the tool flange, so that information thereabout may be delivered to a unit of the robot controlling the movements of the robot. The spokes have of course to provide a connection between the ring and the hub being rigid, so that the accuracy of the operation of the tool will not be lowered thereby but still allowing the tensiometers to be influenced by forces and torques applied to the tool and being below the levels acceptable therefore.

According to another embodiment of the invention said sensor means comprises at least one sensor member in the form of a tensiometer changing the resistivity when extended or compressed, and according to a still further embodiment said sensor means comprises at least one sensor member in the form of a piezo resistive element. The use of such sensor members enables reliable measurements of said forces and torques while keeping the costs for the sensor means at an attractive low level.

According to another embodiment of the invention the robot comprises a printed circuit card built into said tool flange, and sensor members of said sensor means are connected to said printed circuit card for delivering measurement signals to a unit controlling the operation of the robot. Such a printed circuit card may easily be built into the tool flange for facilitating the communication between said control unit and the sensor means.

The invention also relates to a method and a use according to the corresponding appended claims.

Other advantage features as well as advantageous of the pre-sent invention appear from the following description and the other dependent claims.

BRIEF DESCRIPTION OF THE DRAWINGS

With reference to the appended drawings below follows a specific description of embodiments of the invention cited as examples. In the drawings.

DETAILED DESCRIPTION OF EMBODIMENTS OF THE INVENTION

Figure 1:
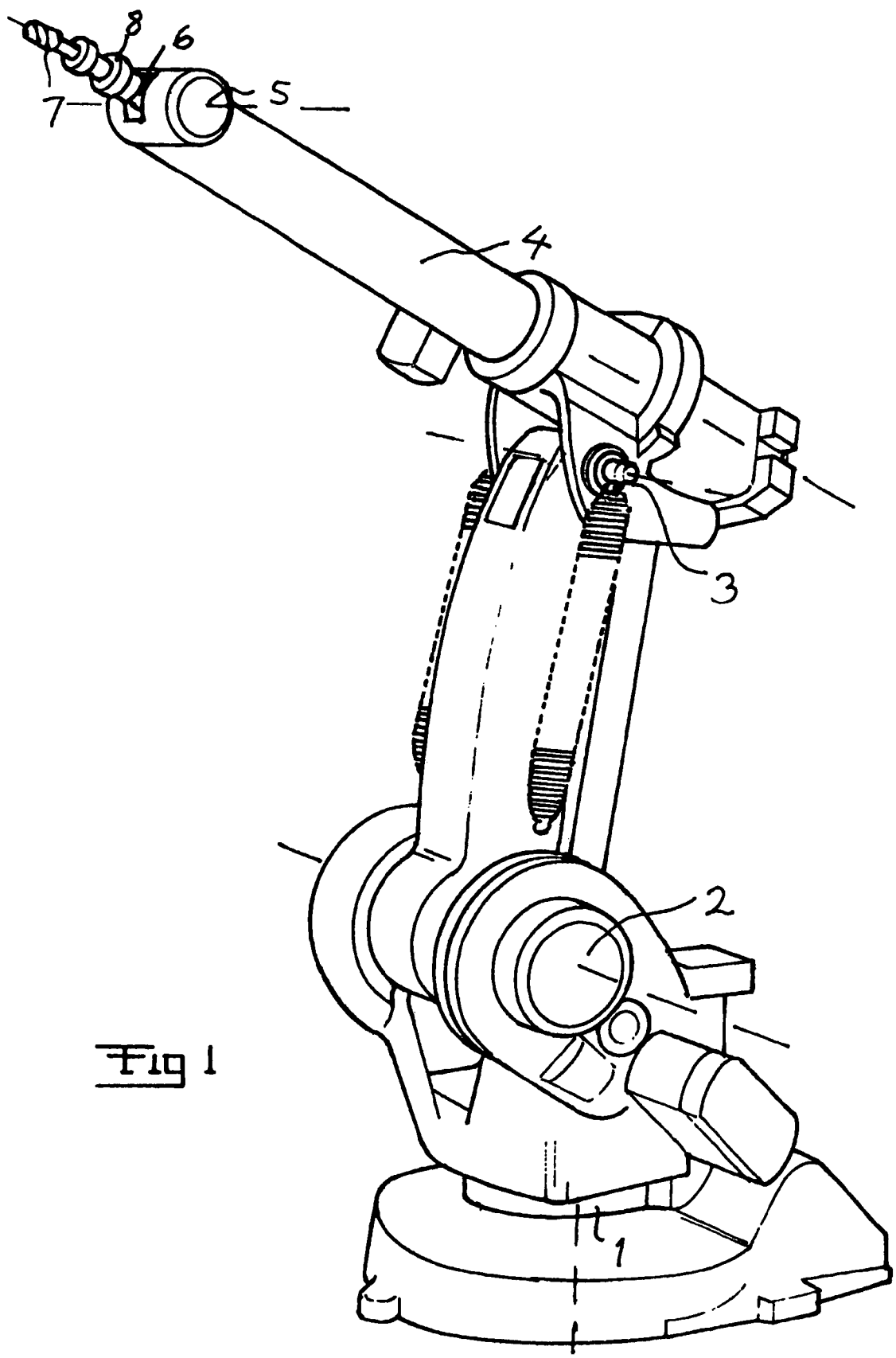
FIG. 1 is a simplified perspective view of a known industrial robot to which the present invention may be applied.
Figure 2:
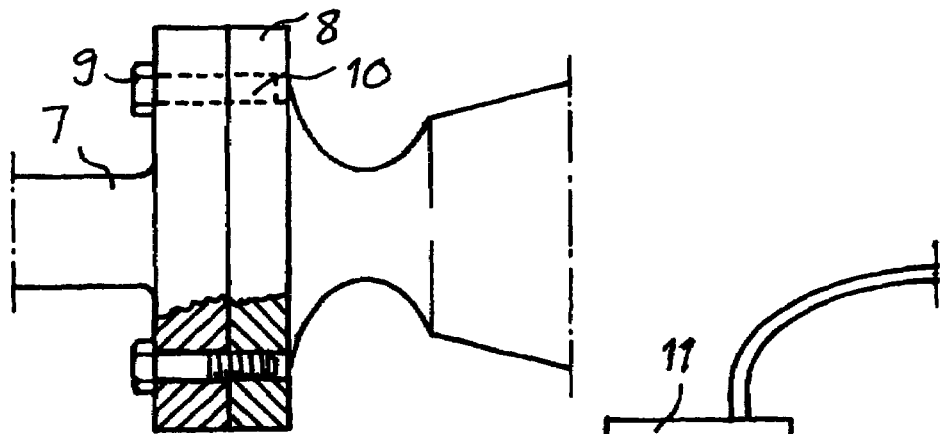
FIG. 2 is a simplified view illustrating a tool flange and parts connected thereto of an industrial robot already known.
Figure 3:
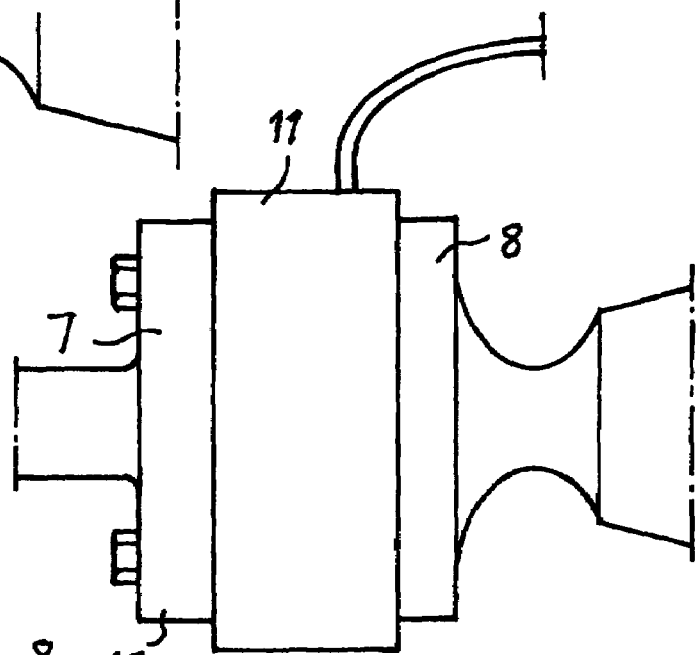
FIG. 3 is a view similar to that of FIG. 2 illustrating the arrangement of sensor means on the tool flange of a robot according to the prior art.
Figure 4:
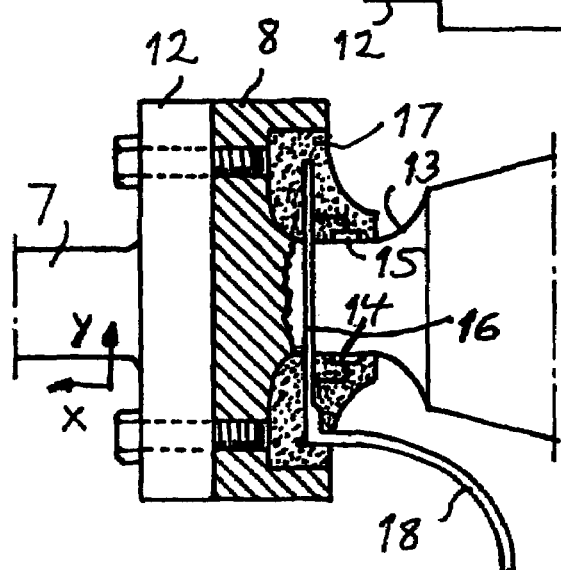
FIG. 4 is a partially sectioned view similar to that of FIG. 2 illustrating the region of the tool flange of an industrial robot according to a first embodiment of the invention.
Figure 4:
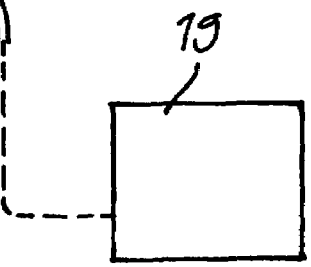

The region of the tool flange in an industrial robot according to a first preferred embodiment of the invention is schematically illustrated in FIG. 4. The tool flange 8 is an integral part with a carrier 13 in the form of an axle pin which may be connected to a fork defining the axis 5 indicated on the robot shown in FIG. 1. The tool flange with the carrier 13 may have substantially the same shape as for a corresponding robot having no sensor means. The sensor means comprises sensor members 14, 15 in the form of tensiometers arranged on the carrier 13 and adapted to sense forces and/or torques applied to the carrier 13 and by that to the tool flange 8 and the tool 7. These tensiometers may for example be silicon strain gauges of the type changing the resistivity when extended or compressed or the sensor members may be in the form of piezo resistive elements. The sensor members 14, 15 shown in the figure may for example be adapted to measure forces in directions enabling calculation of for instance the force on the tool in the direction according to the arrow x and the torque with respect to the direction according to the arrow y. More sensor members than those shown in this figure may be applied to the carrier 13.

The sensor members are connected to an electronic arrangement 16 forming an interface between the sensor members and an output signal to a unit 19 controlling the operation of the robot. The electronic arrangement may be arranged on a printed circuit card built into the tool flange. The printed circuit card and the sensor members may be embedded into a protecting plastic layer 17. A cable 18 is connected to the electronic arrangement for delivering measurement results from the sensor members to the control unit 19 schematically indicated controlling the operation of the robot. The sensor means may also be provided with electrical energy through said cable 18 when necessary.

Figure 5:
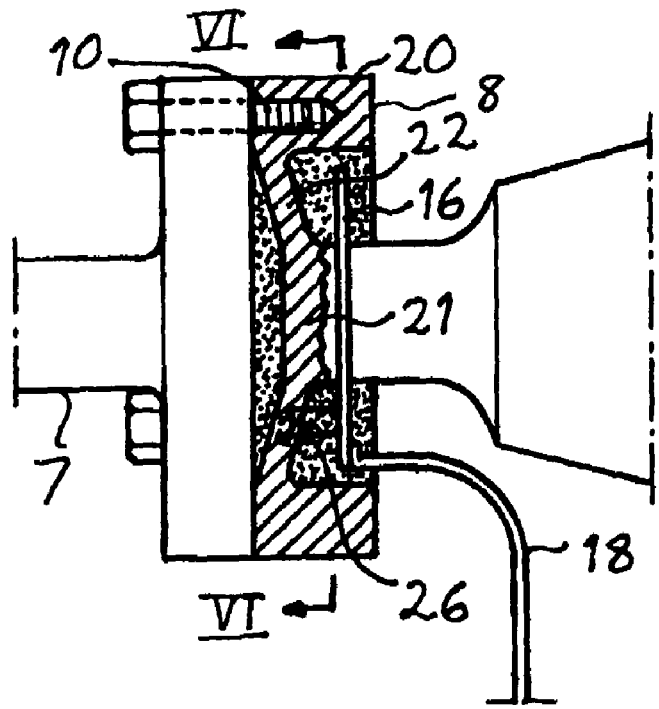
FIG. 5 is a view similar to that according to FIG. 4 of the tool flange region of an industrial robot according to a second embodiment of the invention.
Figure 6:
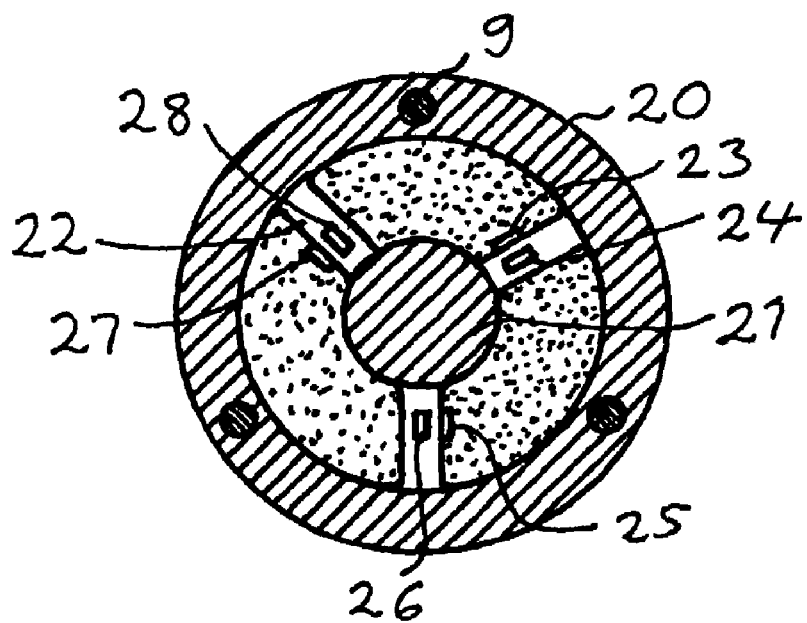
FIG. 6 is a partially sectioned view according to VI-VI in FIG. 5.

FIGS. 5 and 6 illustrate a region of the tool flange of an industrial robot according to a second embodiment of the present invention. The tool flange 8 is in this embodiment slightly modified with respect to a conventional tool flange by having an outer ring 20 provided with tool securing means in the form of threaded holes 10, an inner hub 21 forming said carrier of the tool flange in the form of an axle pin as in the embodiment according to FIG. 4, and substantially rigid spokes 22 interconnecting the hub and the ring. Sensor members 23-28 are arranged on the spokes for sensing forces and torques applied to the tool 7 secured to the tool flange 8. The sensor members are strain gauges arranged in couples with an angular distribution around the centre axis of the tool flange of 120° and with the sensors in each couple arranged perpendicular to each other. The sensor members may in this way sense forces for determining forces according to three degrees of freedom and torques according to three degrees of freedom, so that all forces and torques applied on the tool/tool flange may be determined. The spokes and the sensor members are here together with an electronic arrangement 16 embedded in a protecting plastic layer 17 as in the embodiment according to FIG. 4. Other "deformable" parts than spokes, such as for example a membrane-like deformation zone, are also possible for the application of tensiometers for measuring forces and/or torques.

Figure 7:
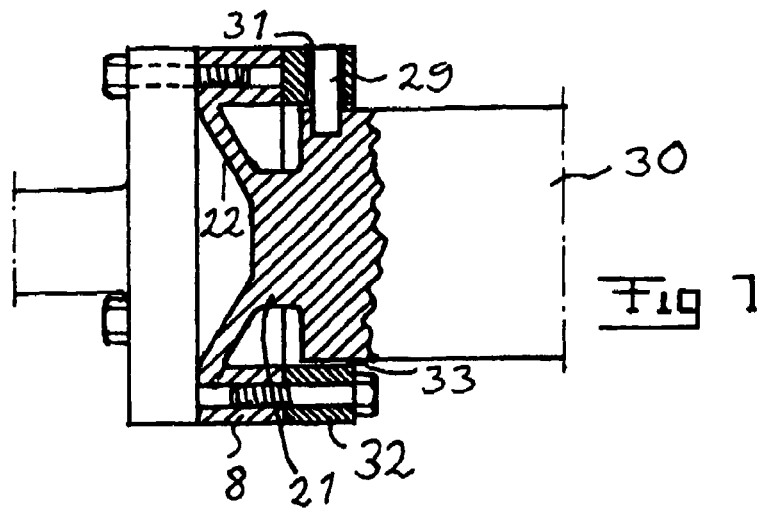
FIG. 7 is a view similar to that according to FIG. 5 of the tool flange region of an industrial robot according to a third embodiment of the invention.

FIG. 7 illustrates a region of the tool flange of an industrial robot according to a third embodiment of the present invention. This embodiment differs from that according to FIG. 5 mainly by the fact that it is provided with an overload protection ensuring that the deformation of the spokes will not exceed a predetermined level. This is ensured by arranging preferably three or more radially extending pins 29 evenly distributed around the axle 30. These pins are arranged with a play 31 with respect to a ring 32 secured to the tool flange 8. This ring 32 is also arranged with a radial play 33 with respect to the axle 30. These plays 31, 33 define the maximum deformation of the tool flange with spokes allowed. The considerably smaller cross-section area of the spokes 22 with respect to the hub 21 results in deformations of the hub being neglectable in comparison with deformations of the spokes.

Figure 8:
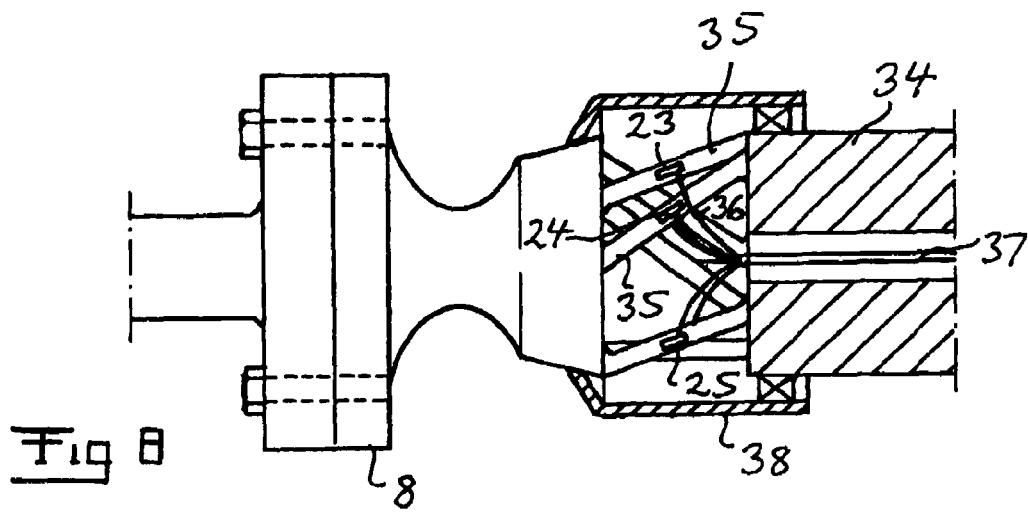
FIG. 8 is a view similar to that according to FIG. 5 of the tool flange region of an industrial robot according to a fourth embodiment of the invention.

FIG. 8 illustrates a region of the tool flange 8 of an industrial robot according to a fourth embodiment of the present invention, in which the sensor members 23-28 (not all of them are visible in the figure) are arranged in a specially designed axle 34. This axle includes six so-called kinematic links 35 interconnecting the carrier of the tool flange 8 with the axle itself. The sensor members are arranged on these kinematic links and are through wires 36 connected to a cable 37 extending inside the axle 34 to a said control unit of the robot. A casing 38 is arranged for protecting the link arrangement.

Figure 9:
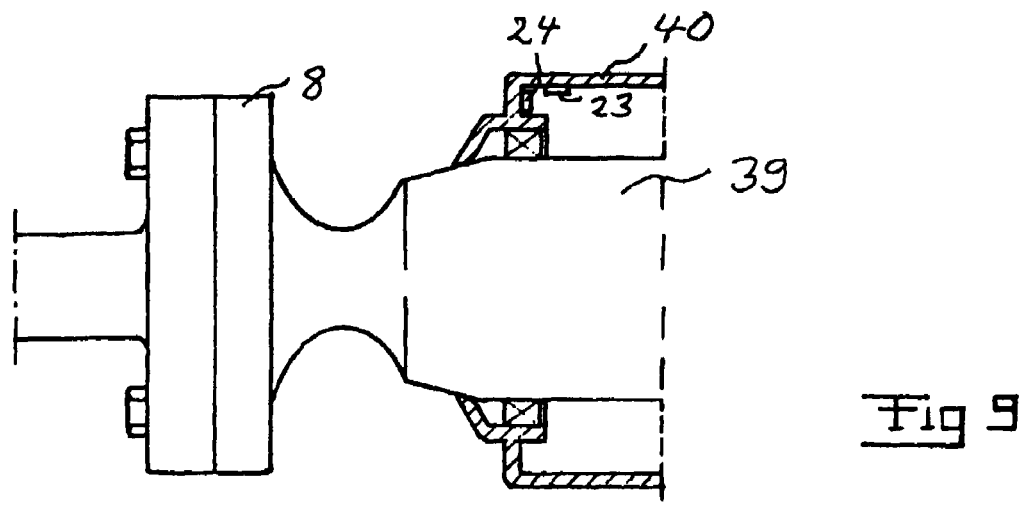
FIG. 9 is a view similar to that according to FIG. 5 of the tool flange region of an industrial robot according to a fifth embodiment of the invention.

FIG. 9 illustrates a region of the tool flange 8 of an industrial robot according a fifth embodiment of the present invention. The axle 39 carrying the tool flange 8 is in this case rigidly connected to the tool flange. Six sensor members are arranged in couples with a distribution of 120° inside the bearing housing 40 of the axle for measuring deformation of the bearing housing and by that determining the forces and/or torques acting on the axle 39 and by that on the tool.

FIGS. 8 and 9 illustrates that "region" in the expression "sensor means is built into the structure of the robot in the region of the tool flange" is to be interpreted to also include location of the sensor members at an end position of an axle carrying the tool flange.

Accordingly, an industrial robot useful for applications requiring force and/or torque sensors is according to the present invention obtained while saving considerable costs with respect to such robots already known. Thus, a robot of this type may very well be used for carrying out assembly works within the field of electronics, automotive industry and household appliances. It may also be used for polishing and grinding works, such as carried out on faucets and turbine blades. Different types of milling and cleaning works are also possible applications. Furthermore, friction stir welding, for example within the automotive and aircraft industry, are other possible applications.

An example of an application in which it is crucial to prevent an object from being exerted to harmful forces and/or torques has been mentioned above when discussing the assembly of a gear box. When using an industrial robot of this type for carrying out milling operations it may be desired to protect the tool itself from being damaged by restricting forces and/or torques applied thereon when arriving to for example burrs on a work piece being machined.

The invention is of course not in any way restricted to the embodiments described above, but many possibilities to modifications thereof would be apparent to a person with ordinary skill in the art without departing from the basic idea of the invention as defined in the appended claims.

The number of the sensor members and the position thereof may be different than shown in the figures as long as they are built into the structure of the robot in the region of the tool flange. "Built into the structure of the robot" means that the sensor means are located within this structure and not located externally to this structure by being arranged between the tool flange and the tool or externally of the tool flange. The sensor members may also comprise tensiometers based on capacitance changes of semiconductor components.

It is pointed out that "tool flange" is to be interpreted as a tool attachment which may have many different shapes, and it has not to have a circular cross-section. "Ring" as used in the claims and in the disclosure above does also comprise other shapes than circular, such as different type of polygons, for instance a square.

"Arranged on said spokes" of course also comprises the case of arranging a sensor member partially or totally embedded into a said spoke.

It is also possible to evaluate the torque on the robot arm connecting to the tool flange by measuring the current in an electric motor turning the tool flange and by that the motor torque.

"Rigidly connected" as used in the description and the claims does not exclude a possibility to disconnect the members thus connected.

An electronic arrangement as shown in FIGS. 4 and 5 may also be arranged in the other embodiments described above.

The invention claimed is:

1. An industrial robot, comprising:
   a tool flange at the end of an outer arm of the robot the tool flange being integral with a tool flange carrier;
   securing elements configured to secure a tool to the tool flange; and
   a sensor adapted to sense at least one of forces or torques applied to a tool secured to said tool flange, wherein said sensor comprises at least one sensor member built into the tool flange or arranged on the tool flange carrier.

2. The robot according to claim 1, wherein said sensor comprises at least one tensiometer secured to the tool flange.

3. The robot according to claim 1, wherein said sensor comprises a plurality of sensor members for sensing forces and/or torques according to a plurality of degrees of freedom.

4. The robot according to claim 3, wherein the sensor comprises six sensor members for sensing and later evaluation of forces according to a plurality of degrees of freedom and/or torques according to a plurality of degrees of freedom.

5. The robot according to claim 1, wherein said tool flange comprises a ring provided with said tool securing elements and connected through substantially rigid spokes to an inner hub fixed to a carrier connected to said arm, and wherein said sensor comprises at least one or more sensor member arranged on at least one of said spokes.

6. The robot according to claim 1, wherein said sensor comprises at least one sensor member comprising a tensiometer changing the resistivity when extended or compressed.

7. The robot according to claim 1, wherein said sensor comprises at least one sensor member comprising a piezo resistive element.

8. The robot according to claim 1, further comprising:
   an electronic arrangement built into said tool flange, wherein sensor members of said sensor are connected to said electronic arrangement for delivering measurement signals to a unit controlling the operation of the robot.

9. The robot according to claim 8, further comprising: a cable configured to connect said electronic arrangement to said control unit.

10. The robot according to claim 1, wherein said tool flange is arranged to be turned with respect to said robot arm about a center axis of said flange.

11. A method for sensing forces or torques applied to a tool secured to a tool flange of an industrial robot, the method comprising: providing an industrial robot comprising a tool flange is integral with a tool flange carrier, and:
    measuring deformation of a bearing housing for an axle rigidly connected to the tool flange carrier to determine the at least one of forces or torques acting on said axle and thereby the at least one of forces or torques acting on the tool.

12. The method according to claim 11, wherein tensiometer is used for sensing the forces and/or torques applied to the tool secured to the tool flange of the industrial robot.

13. The robot according to claim 1, wherein said sensor comprises at least one tensiometer secured to the tool flange carrier.

14. The robot according to claim 1, wherein said sensor comprises at least one sensor member built into the tool flange and at least one sensor arranged on the tool flange carrier.

* * * * *